(12) United States Patent
Masukawa et al.

(10) Patent No.: US 8,219,363 B2
(45) Date of Patent: Jul. 10, 2012

(54) JET NOISE MODELING METHOD, JET NOISE ANALYZING METHOD, AND AIRCRAFT DESIGNING METHOD

(75) Inventors: Noboru Masukawa, Kakamigahara (JP); Eiji Shima, Kakamigahara (JP); Kenji Hayama, Kakamigahara (JP)

(73) Assignee: Kawasaki Jukogyo Kabushiki Kaisha, Kobe-Shi (JP)

( * ) Notice: Subject to any disclaimer, the term of this patent is extended or adjusted under 35 U.S.C. 154(b) by 914 days.

(21) Appl. No.: 11/907,796

(22) Filed: Oct. 17, 2007

(65) Prior Publication Data

US 2008/0103739 A1     May 1, 2008

(30) Foreign Application Priority Data

Oct. 20, 2006   (JP) .................................. 2006-286819

(51) Int. Cl.
    *G06F 7/60* (2006.01)
(52) U.S. Cl. ................ 703/2; 703/6; 181/210; 181/224; 181/290; 244/54; 244/1 N
(58) Field of Classification Search ............ 239/265.11, 239/265.33; 700/280
    See application file for complete search history.

(56) References Cited

U.S. PATENT DOCUMENTS

| 2003/0146296 | A1* | 8/2003 | Braga Da Costa Campos .................. 239/265.11 |
| 2006/0080418 | A1 | 4/2006 | Wu | |

FOREIGN PATENT DOCUMENTS

| DE | 40 30 753 A1 | 4/1992 |
| JP | A 1-227023 | 9/1989 |
| JP | A 6-4512 | 1/1994 |
| JP | A 2005-3368 | 1/2005 |

OTHER PUBLICATIONS

Umesh Paliath Numerical Simulation of Jet Noise The Pennsylvania State University, The Graduate School, May 2006.*
M. J. Lighthill On Sound Generated Aerodynamically II. Turbulence as a Source of Sound Proceedings of the Royal Society of London Series A. Mathematical and Physical Sciences, vol. 222, No. 1148, Feb. 23, 1954, pp. 1-32.*
M. J. Lighthill On Sound Generated Aerodynamically II. General Theory Proceedings of the Royal Society of London Series A. Mathematical and Physical Sciences, vol. 211, No. 1107, Mar. 20, 1952, pp. 564-587.*
Georgiadis, N. J., et al, "Navier-Stokes Analysis Methods for Turbulent Jet Flows with Application to Aircraft Exhaust Nozzles," Progress in Aerospace Sciences, Oxford, GB, Dec. 1, 2006, pp. 377-418.
European Search Report, EP 07 11 8867, dated May 7, 2010.

(Continued)

*Primary Examiner* — Kamini S Shah
*Assistant Examiner* — Cuong Luu
(74) *Attorney, Agent, or Firm* — Oliff & Berridge, PLC

(57) ABSTRACT

A jet noise source modeling method of creating a jet noise source model, includes: setting a plurality of point sound sources by quantizing a strength distribution of a jet noise source determined through an analysis of a jet stream and determining respective sound source strengths of respective point sound sources; and determining respective phases of the respective point sound sources based on a known noise level of a far free sound field related with the jet stream. An aircraft having an airframe capable of insulating the interior thereof from noises is designed on the basis of the results of the analysis.

4 Claims, 13 Drawing Sheets

OTHER PUBLICATIONS

Van Dalsem et al., "Numerical Simulation of Jet Noise," Computing Systems in Engineering, Pergamon Press, Oxford, TB, vol. 3, No. 1-4, Jan. 1, 1992, pp. 169-179.

Georgiadis, N. J., et al, "Navier-Stokes Analysis Methods for Turbulent Jet Flows with Application to Aircraft Exhaust Nozzles," Progress in Aerospace Sciences, Oxford, GB, 2006.12.001, pp. 377-418.

European Search Report, EP 07 1 1 8867, dated May 7, 2010.

Tam et al., "Jet Mixing Noise from Fine Scale Turbulence," American Institute of Aeronautics and Astronautics Journal, AIAA-98/2354, pp. 880-891, 1998.

Reba et al., "Sound Radiated by Large-Scale Wave-Packets in Subsonic and Supersonic Jets," $15^{th}$ AIAA/CEAS Aeroacoustics Conference, American Institute of Aeronautics and Astronautics, AIAA-2009-3256, May 11-13, 2009, Miami, Florida.

Tam et al., "Computation of Mean Flow Refraction Effects on Jet Noise," American Institute of Aeronautics and Astronautics Journal, AIAA-97/1599-CP, pp. 112-126, 1997.

Tam et al., "On the Two Components of Turbulent Mixing Noise from Supersonic Jets," $2^{nd}$ AIAA/CEAS Aeroacoustics Conference, American Institute of Aeronautics and Astronautics, AIAA-96/1716, May 6-8, 1996, State College, PA.

Tam et al., "Turbulent Mixing Noise from Supersonic Jets," $15^{th}$ AIAA Aeroacoustics Conference, American Institute of Aeronautics and Astronautics, AIAA-93/4408, Oct. 25-27, 1993, Long Beach, CA.

Tam et al., "On the Relationship Between Broadband Shock Associated Noise and Screech Tones," AIAA/NASA $9^{th}$ Aeroacoustics Conference, AIAA-84/2276, Oct. 15-17, 1984, Williamsburg, Virginia.

Kandula et al., "On the Scaling Laws for Jet Noise in Subsonic and Supersonic Flow," $9^{th}$ AIAA/CEAS Aeroacoustics Conference and Exhibit, American Institute of Aeronautics and Astronautics, AIAA-2003-3288, May 12-14, 2003, Hilton Head, South Carolina.

Panda et al., "Further Progress in Noise Source Identification in High Speed Jets Via Causality Principle," $9^{th}$ AIAA/CEAS Aeroacoustics Conference and Exhibit, American Institute of Aeronautics and Astronautics, AIAA-2003-3126, May 12-14, 2003, Hilton Head, South Carolina.

Tam et al., "Fine-Scale Turbulence Noise from Hot Jets," American Institute of Aeronautics and Astronautics Journal, vol. 43, No. 8, Aug. 2005, pp. 1675-1683.

Tam et al., "Modified $\kappa$-$\epsilon$ Turbulence Model for Calculating Hot Jet Mean Flows and Noise," American Institute of Aeronautics and Astronautics Journal, vol. 42, No. I, Jan. 2004, pp. 26-34.

Morris et al., "Acoustic Analogy and Alternative Theories for Jet Noise Prediction," American Institute of Aeronautics and Astronautics Journal, vol. 40, No. 4, Apr. 2002, pp. 671-680.

Tam et al., "Noise from Fine-Scale Turbulence of Nonaxisymmetric Jets," American Institute of Aeronautics and Astronautics Journal, vol. 40, No. 3, Mar. 2002, pp. 456-464.

Narayanan et al., "High Subsonic Jet Experiments: Turbulence and Noise Generation Studies," American Institute of Aeronautics and Astronautics Journal, vol. 40, No. 3, Mar. 2002, pp. 430-437.

Tam, "Stochastic Model Theory of Broadband Shock Associated Noise from Supersonic Jets," Journal of Sound and Vibration vol. 116, No. 2, 1987, pp. 265-302.

Tam et al., "Sound generated by instability waves of supersonic flows. Part 1. Two-dimensional mixing layers," Journal Fluid Mech., vol. 138, 1984, pp. 249-271.

Tam et al., " Sound generated by instability waves of supersonic flows. Part 2. Axisymmetric Jets," Journal Fluid Mech., vol. 138, 1984, pp. 273-295.

* cited by examiner

JET NOISE MODELING METHOD, JET NOISE ANALYZING METHOD, AND AIRCRAFT DESIGNING METHOD

CROSS REFERENCE TO RELATED APPLICATIONS

This application is based upon the prior Japanese Patent Application No. 2006-286819 filed on Oct. 20, 2006, the entire contents of which are incorporated herein by reference.

BACKGROUND OF THE INVENTION

1. Field of the Invention

The present invention relates to a jet noise modeling method of modeling jet noises generated by a jet stream jetted by a jet engine, a jet noise analyzing method, and an aircraft designing method using the jet noise modeling method and the jet noise analyzing method.

2. Description of the Related Art

An aircraft design is required to include means for reducing jet noises generated by a jet stream jetted by an engine and uses the shielding effect of an airframe on isolating jet noises. It is necessary to analyze a sound field of jet noises to examine the noise shielding effect of an airframe. A jet stream is analyzed by unsteady Navier-Stokes analysis (NS analysis), such as large eddy simulation (LES) or direct Navier-Stokes (DNS) analysis. The condition of the sound field of jet noises is determined on the basis of a pressure variation estimated from the results of analysis. Unsteady NS analysis takes extremely much time. It is very difficult for the ability of a current computer to achieve the analysis of a jet stream jetted by an actual jet engine.

An aerodynamic sound source search system disclosed in JP-A 2005-3368 determines a sound source distribution of aerodynamic sounds generated around an object placed in a field of flow. This aerodynamic sound source search system calculates the distribution of velocity vectors in a predetermined finite computational region, and calculates a sound source distribution around the object on the basis of the distribution of velocity vectors, taking into account the influence of vortices outside the computational region. This aerodynamic sound source search system sets a predetermined finite computational region as a range for calculating velocity vectors in the field of flow, converts the influence of vortices outside the computational region into the influence of vortices in the computational region, and determines the distribution of dipole sound sources by using an expression developed by combining the Howe's vortex expression and a compact Green function suitable for the shape of the object. Although this aerodynamic sound source search system can determine the distribution of sound sources in the field of flow, this aerodynamic sound source search system cannot be applied to the analysis of a sound field of jet noises.

A noise environment evaluating system disclosed in JP-A 6-4512 is used for analyzing the levels and distribution of noises generated by a plurality of noise sources. This noise environment evaluating system enters data on the arrangement of buildings including walls, and noise sources, produces a sound ray model of sound propagation passages from the data on the arrangement of buildings and the noise sources, determines sound pressure levels at observation points on the sound propagation passages by using an expression expressing sound attenuation in distance, and synthesizes the thus determined sound pressure levels. This noise environment evaluating system can simply evaluate the levels and distribution of the current noises by entering data on the arrangement of buildings, and noise sources. Thus this noise environment evaluating system can simulate the changes of a noise environment resulting from change in planning conditions without restraint. However, this noise environment evaluating system cannot be applied to the analysis of a sound field of jet noises.

A noise level predicting method is disclosed in JP-A 1-227023. This noise level predicting method predicts a noise level on the basis of the sound power level of a sound source and distance from the sound source. This noise level predicting method calculates the mean sound power level of the sound power levels of a plurality of element planes defined by circumferentially dividing a semispherical plane having its center at the sound source, and calculates the respective ratios of the sound power levels of the element planes to the mean sound power level to use the same as noise directivities for correcting the noise levels. This noise level predicting method cannot be applied to the analysis of a sound field of jet noises.

SUMMARY OF THE INVENTION

Accordingly, it is an object of the present invention to provide a jet noise source modeling method of modeling a jet noise source applicable to the analysis of jet noises, and to provide a jet noise analyzing method and an aircraft designing method using the jet noise source modeling method.

The present invention is a jet noise source modeling method of creating a jet noise source model, comprising:
  setting a plurality of point sound sources by quantizing a strength distribution of a jet noise source determined through an analysis of a jet stream and determining respective sound source strengths of respective point sound sources; and
  determining respective phases of the respective point sound sources based on a known noise level of a far free sound field related with the jet stream.

According to the present invention, the plurality of point sound sources are set through the analysis of a jet stream, the respective sound strengths of the point sound sources are determined, and the respective phases of noises of the point sound sources are determined by using data on the known noise level. A jet noise source model can be practically formed by thus modeling noises of a jet stream in a short period. The plurality of point sound sources are determined by quantizing the strength distribution in the jet sound source, and the phases of the point sound sources are determined so as to coincide with a known noise level. Thus actual jet noises can be accurately modeled. The sound source model thus obtained is suitable for application to the analysis of a sound field around a jet stream, such as the analysis of the noise shielding effect of an object.

Preferably, the point sound sources are set along a jet axis of the jet stream.

According to the present invention, the point sound sources are set along the jet axis of a jet stream. Noises of the jet stream are distributed symmetrically with respect to the jet axis and hence an efficient sound source model can be obtained. Any objects are not arranged on the jet axis, and the point sound sources are arranged on the jet axis. Therefore, the sound source model is suitable for analyzing a sound field around the jet stream, such as the analysis of the noise shielding effect of an object.

The present invention is a jet noise analyzing method of analyzing a sound field around a jet stream by using a jet noise source model created by the jet noise source modeling method mentioned above.

According to the present invention, a sound field of jet noises can be analyzed by using the suitable sound source model obtained by the sound source modeling method. Therefore, the jet noise shielding effect of an object and a sound field around a jet stream can be properly analyzed.

The present invention is an aircraft designing method of designing an aircraft, wherein an influence of an airframe on a jet noise estimated by the jet noise analyzing method mentioned above is taken into account when the aircraft is designed.

According to the present invention, the effect of an airframe on jet noises can be properly analyzed by the analyzing method and an aircraft can be designed on the basis of the results of the analysis. Thus an aircraft capable of effectively shielding the interior thereof from jet noises can be designed.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

The jet noise analyzing method (hereinafter, referred to as "noise analyzing method") in the preferred embodiment includes a sound source modeling method of modeling a jet noise source. According to the noise analyzing method, a sound field around a jet stream is analyzed by using a sound source model produced by the sound source modeling method. Therefore, the noise analyzer 20 shown in FIG. 2 is a modeling device for producing a sound source model.

Figure 3:
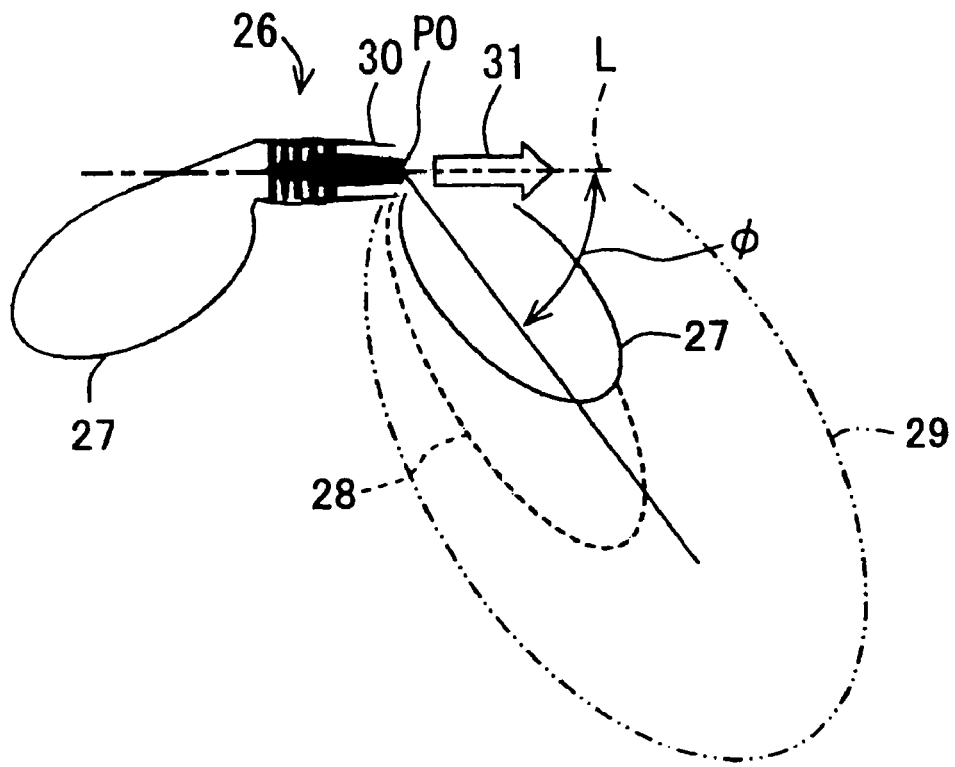
FIG. 3 is a sectional view of a nozzle 30 for assistance in explaining noises generated by a jet engine 26.

An aircraft is provided with a jet engine 26 having a nozzle 30 as shown in FIG. 3. The jet engine 26 jets a jet stream 31 through the nozzle 30 to generate a thrust. Noises generated by the jet engine 26 include a noise generated by a compressor and directionally spreading as indicated by continuous lines 27 in FIG. 3, a noise generated by a turbine and a combustor and directionally spreading as indicated by a broken line 28 in FIG. 3, and a jet noise generated by a jet stream 31 and directionally spreading as indicated by a two-dot chain line 29 in FIG. 3. The jet noise generated by the jet stream 31 has a high noise level and spreads in a wide range. Therefore, the reduction of the jet noise is important for the development and designing an aircraft that produces a thrust by jetting a jet stream 31, particularly, for a very-high-speed transport that cruises at a very high speed of, for example, a Mach number M of 1.6. The jet engine 26, such as a turbofan engine, used by a very-high-speed transport is an engine having a low bypass ratio. As mentioned above, the jet noise (mixing noise) is a principal sound source. The jet noise may be reduced by an ejector nozzle or a lobed mixer. However, the use of an ejector nozzle or a lobed mixer increases the weight of the aircraft deteriorating the flying performance of the aircraft. Thus it is important for an aircraft, such as a very-high-speed transport, to reduce the jet noise to the least possible extent.

A jet noise that reaches a part of an airframe on the opposite side of the jet stream with respect to the airframe can be reduced without using additional members which will increase the weight of the aircraft if the jet noise can be shielded by the airframe. Therefore, a noise analyzing method of the present invention is used, for example, to evaluate the noise shielding effect of the airframe. The airframe includes main wings, a fuselage, a vertical fin and horizontal stabilizers. The evaluation of the noise shielding effect of the airframe is only an example of uses of the noise analyzing method of the present invention and the noise analyzing method of the present invention is applicable to the analysis of a jet noise for other purposes.

Figure 2:
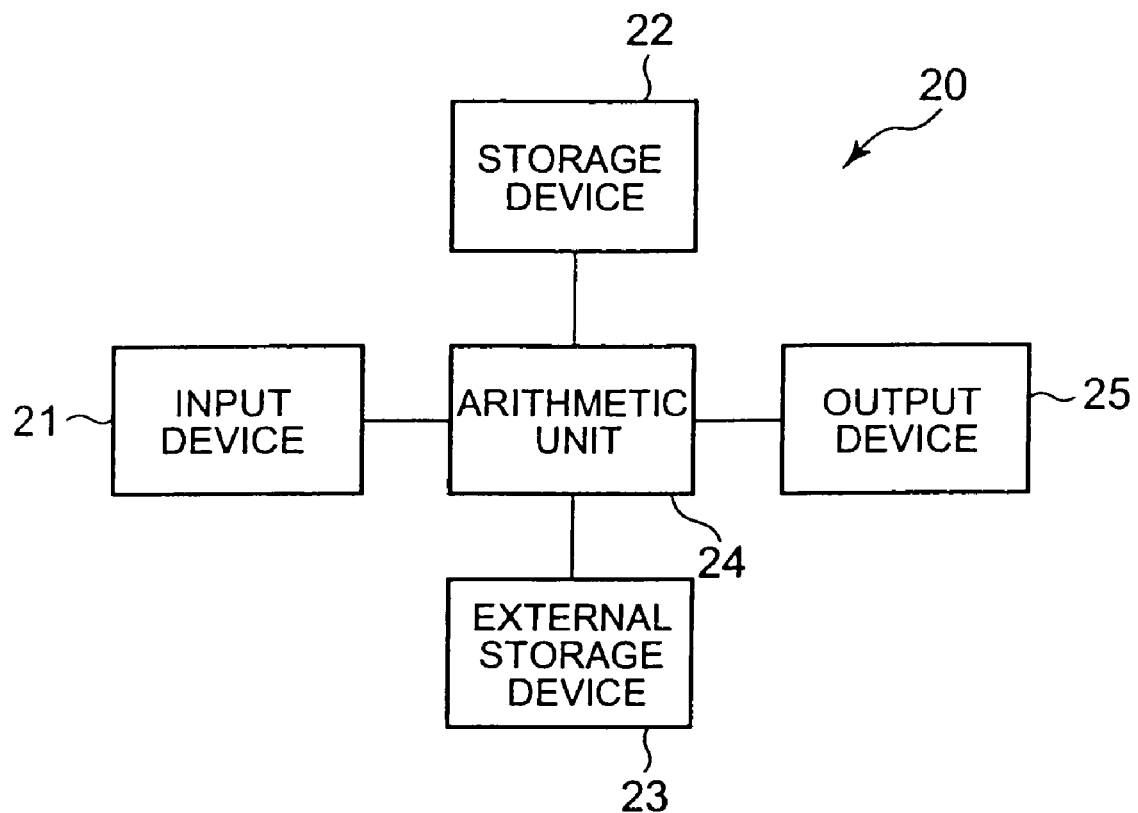
FIG. 2 is a block diagram of a noise analyzer 20 capable of carrying out the jet noise analyzing method shown in FIG. 1.

The noise analyzer 20 shown in FIG. 2 includes an input device 21, a storage device 22, an external storage device 23, an arithmetic unit 24 and an output device 25. The noise analyzer 20 is, for example, a super computer. The input device 21 is, for example, a keyboard or the like for entering jet information about the jet stream 31, instruction information about instructions requesting modeling and analyzing the sound source of the jet noise, and such. The information about the jet stream 31 is, for example, information including jet conditions including the inside diameter of the nozzle 30, the velocity of the jet stream 31 at the exit of the nozzle 30 (hereinafter referred to as "jet exit velocity"), the temperature of the jet stream 31 at the exit of the nozzle 30 (hereinafter referred to as "jet exit temperature"), and the pressure of the jet stream 31 at the exit of the nozzle 30 (hereinafter referred to as "jet exit pressure").

The storage device 22 is a means, for storing information in a storage medium held in the computer, including, for example, a hard disk drive and a semiconductor memory. The external storage device 23 is a means for writing information to detachable recording mediums, such as compact disks (CDs) and digital versatile disks (DVDs), and reading the recorded information from the recording mediums. An information holding unit includes the storage device 22 and the external storage device 23. Data necessary for operations specified by an operation program including directions for accomplishing a sound source modeling method and a noise analyzing method of the present invention, and an operation program including directions for accomplishing necessary operations are stored by the unit. The information holding unit may temporarily hold information entered by operating the input device 21.

The arithmetic unit 24 is, for example, a central processing unit (CPU). The arithmetic unit 24 reads an operation program including an optimal operation program and an analytical operation program and data from either of the storage device 22 and the external storage device 23 according to directions entered by operating the input device 21. Then, the arithmetic unit 24 executes operations for modeling a jet noise source and noise analysis using jet conditions. The output device 25 provides information including results operations of the arithmetic unit 24. The output device 25 is, for example, a display. The output device 25 may be a printer.

The external recording device 23 may record information including the jet conditions on a readable recording medium, read the information from the recording medium and enter the information into the arithmetic unit 24. Results of operations of the arithmetic unit 24 may be recorded on a recording medium and sent out by the external recording device 23. Thus the external recording device 23 functions also as an information input means and an information output means for providing information including results of operations.

Figure 1:
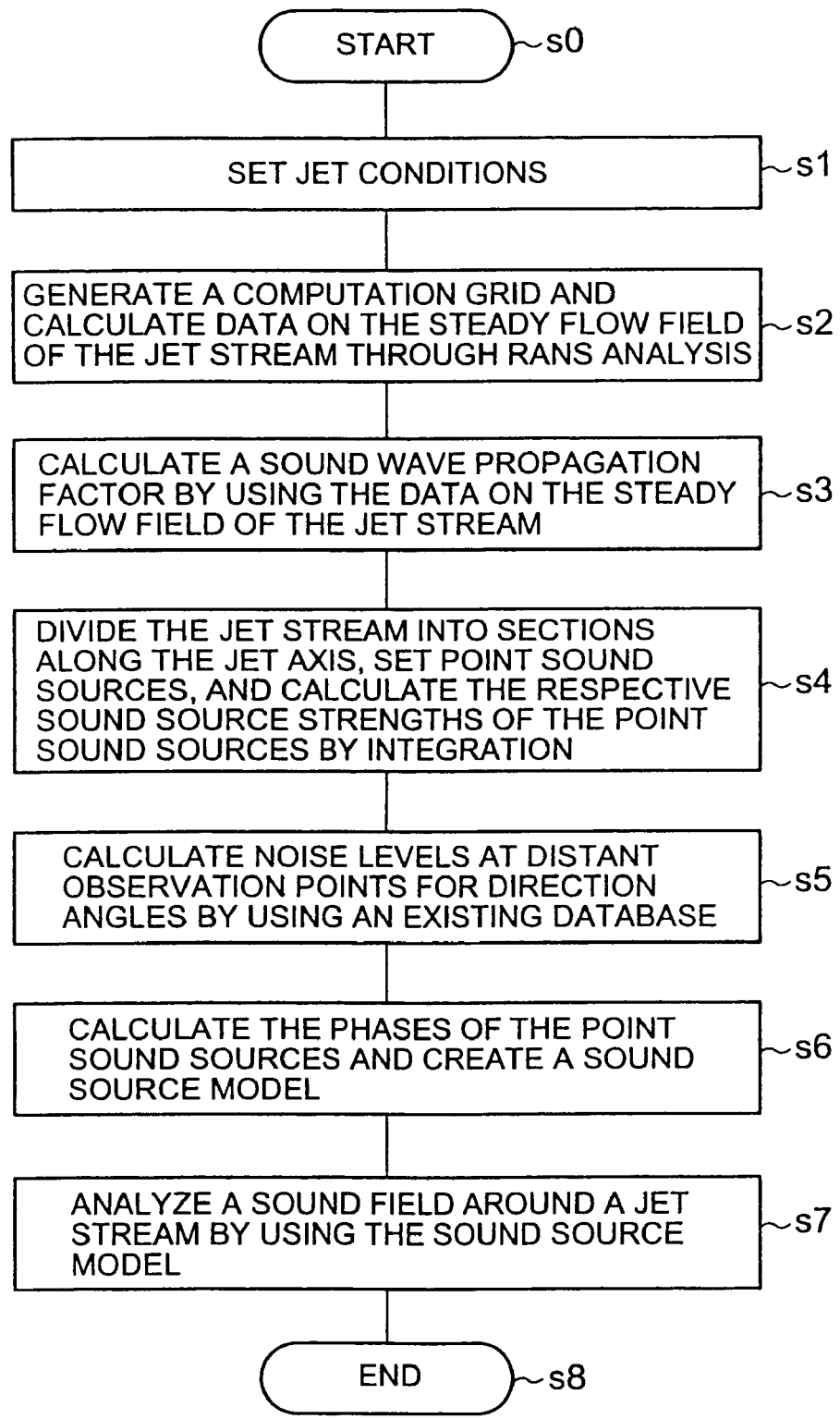
FIG. 1 is a flow chart of a jet noise analyzing method in a preferred embodiment according to the present invention.

The arithmetic unit 24 of the noise analyzer 20 carries out a noise analyzing method. The input device 21 enters the jet conditions into the arithmetic unit 24 and gives a command causing the arithmetic unit 24 to perform noise analysis. As shown in FIG. 1, a noise analyzing procedure is started in step s0. Then, in step s1, namely, a condition setting step, the arithmetic unit 24 receives the input jet conditions and set the same as operational conditions. After the step s1 has been accomplished, the noise analyzing procedure goes to step s2.

In step s2, namely, data calculating step, a computation grid is generated, and data on the steady flow field of the jet stream 31 (hereinafter, referred to as "steady flow data") is obtained through RANS analysis (Reynolds-averaged Navier Stokes analysis). The steady flow data on the jet stream 31 includes velocity, temperature, pressure, intensity of turbulence, and turbulence damping rate. After the data has been calculated in step s2, the noise analyzing procedure goes to step s3, namely, a propagation factor calculating step.

In step s3, namely, a propagation factor calculating step, a propagation factor for a sound wave is calculated by using the steady flow data on the jet stream. Then, in step s4, namely, a sound source strength calculating step, the jet stream 31 is divided into sections along the axis L of the jet stream 31 (hereinafter referred to as "jet axis L"), point sound sources are set at the respective middle points of the sections, respectively, and the respective strengths of the point sound sources are calculated. Then, the noise analyzing procedure goes to step s5, namely, a noise level determining step.

In step s5, noise levels at observation points far from the jet stream 31 and having the same jet conditions as those determined in step s1 respectively for direction angles ϕ are retrieved from an existing database. As shown in FIG. 3, each direction angle ϕ is an angle between a line extending from a point P0 on the jet axis L at the outlet of the nozzle 30 and the jet axis L. The direction angle ϕ, is called also an azimuth angle. For example, the database is a collection of measured data obtained through experiments. After the noise level has been determined in step s5, the noise analyzing procedure goes to step s6, namely, a phase determining step.

In step s6, phases are assumed for the point sound sources, and noise levels at the observation points for which the noise levels were determined in step s5. The calculated noise levels are compared with the noise levels retrieved from the database, and the phases are optimized such that the calculated noise levels coincide with the noise levels retrieved from the database, respectively. Thus a sound source model modeling the jet noise generated by the jet stream by a plurality of point sound sources specified by the sound source strengths and the phases is obtained. After the phases have been determined in step s6, the noise analyzing procedure goes to step s7.

The sound source modeling method includes steps s1 to s6. The sound source modeling method generates a sound source model. In step s7, namely, a sound field analyzing step, a sound field around the jet stream is analyzed using the sound source model obtained in step s6. The noise shielding effect of the airframe can be evaluated by analyzing the sound field on an assumption that the airframe is disposed in the sound frame. The noise analyzing procedure is ended in step s8 after the completion of the sound field analysis in step s7.

This embodiment obtains a distribution of point sound sources by quantizing the distribution of sound source strengths, and adjusts the phase angles of the point sound sources so as to coincide with directivities of the point sound sources obtained from the database, such as cold Jet. The sound source model thus created is effective in reproducing directivities. Thus the present invention provides a good noise modeling method. Jet noise is analyzed by using a sound source model formed by the noise modeling method.

This embodiment creates a simple shape model simulating an airframe, uses the sound source model and the simple shape model, uses software for analyzing the sound field around the jet stream, and evaluates the noise shielding effect of the airframe to confirm the noise shielding effect of the airframe. An airframe having a high noise shielding effect is selected and an airframe having the shape of the selected airframe is designed. Thus an ideal airframe can be designed. A designing method according to the present invention designs an airframe having a high noise shielding effect by using the sound source model to design an airframe for an aircraft. There are not particular restrictions on the method of analyzing a sound field using a sound source model, the method may use a finite element method or a boundary element method. This embodiment uses, for example, a fast multipole boundary element method (FMBEM).

It is a great feature of a modeling method according to the present invention that the characteristics of jet noise can be accurately indicated by setting a plurality of point sound sources by quantizing a strength distribution by analysis, such as steady RANS analysis, and representing each point sound source by sound source strength and phase characteristic. The noise characteristic of jet noise is dependent on whether the jet is a subsonic jet or a supersonic jet, whether or not the noise characteristic is affected by the flying speed of the airframe relative to the surroundings, and whether the jet is a cold jet or a hot jet. The modeling method and the analyzing method of the present invention are applicable to the analysis of noises of those various conditions.

The improvement of the computational ability of computers has promoted active studies of a method of directly calculating jet noise generated by the jet stream through the analysis of the unsteady flow of the jet stream by LES (large eddy simulation) and DNS (direct numerical simulation). However, the method cannot be practically applied to the calculation of jet noise because extremely much time is necessary for the ability of the existing computer to accomplish calculation for a sufficiently large number of grids corresponding to conditions for a high Reynolds number.

On the other hand, the steady RANS (Reynolds averaged Navier-stokes) analysis employed by the present invention that estimates jet noise by using data on steady flow obtained from the results of steady RANS analysis of the jet stream is an analysis based on CFD (computational fluid dynamics). According to the present invention, CFD analysis is accomplished by steady-state analysis. The present invention needs to analyze only an axisymmetric, two-dimensional stream and can greatly reduce operations for numerical calculation.

Figure 4:
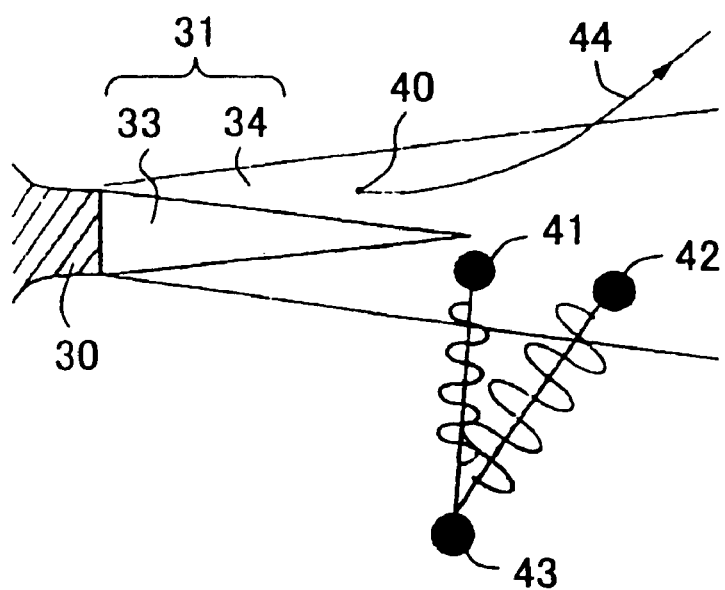
FIG. 4 is a sectional view of a jet stream 31 for assistance in explaining an image of estimating jet noises based on steady RANS analysis.

FIG. 4 is a sectional view of the jet stream 31 for assistance in explaining an image of estimating jet noise based on steady RANS analysis. Propagation of sound waves in the jet stream 31 is modeled by a time-averaged velocity, a time-averaged density and a time-averaged pressure obtained through the steady RANS analysis. A typical phenomenon will be explained with reference to an imaginary sound source 40 by way of example. When a sound wave crosses a strong velocity shear layer in the envelope of the jet stream 31, an inner part of the wavefront advances ahead of an outer part of the wavefront because the velocity of an inner part of the jet stream 31 is higher than that of an outer part of the same. Consequently, the sound wave propagates along a curved path indicated by an arrow 44.

A distribution of sound source strengths and temporal and spatial phase relationships are modeled by turbulence statistics obtained by steady RANS analysis. The turbulence statistics include a time-averaged turbulence strength and a time-averaged turbulence damping ratio. A characteristic phenomenon will be explained with reference to two imaginary sound sources 41 and 42 and an imaginary observation point 43 shown in FIG. 4 by way of example. Interference between sound waves respectively generated by the two imaginary sound sources 41 and 42 in the jet stream 31 occurs at the observation point 43. Those sound waves strengthen or weaken each other depending on the temporal and spatial phase relationships between the imaginary sound sources 41 and 42 at the observation point 43.

The effect of sound sources in the jet stream 31 on noise level in a far field can be calculated by integrating the two models of propagation of the sound waves, and temporal and spatial relationships of the distribution of sound source strengths.

The sound source strength $S(x, f)[Pa^2/Hz]$ at a point x far from the jet stream can be expressed by Expression (1). Some variables in Expression (1) are represented by Expressions (2) to (4).

$$S(x, f) = 4\pi \left(\frac{\pi}{\ln 2}\right)^{3/2} \iiint_{-\infty < x_1 < \infty} \frac{\hat{q}_s^2 l_s^3}{c^2 \tau_s} \frac{|p_a(x_2, x, f)|^2 \exp\left(-\frac{(2\pi f)^2 l_s^2}{\bar{u}^2(4\ln 2)}\right)}{\left[1 + (2\pi f)^2 \tau_s^2 \left(1 - \frac{\bar{u}}{a_\infty}\cos\Theta\right)^2\right]} dx_2 \quad (1)$$

$$l_s = c_l l = c_l \frac{q}{\omega} \quad (2)$$

$$\tau_s = c_\tau \tau = \frac{c_\tau}{\omega} \quad (3)$$

$$\frac{\hat{q}_s}{c} = A\left(\frac{2}{3}\bar{\rho}q^2\right) \quad (4)$$

f: frequency (Hz)
x: Position of an optional point distant from the jet stream 31
$x_2$: Coordinate of an optional point in the jet stream 31
$p_a$: Sound propagation coefficient
$l_s$: Representative size of small eddies
$\tau_s$: Representative damping time of small eddies
$\hat{q}_s$: Standard variation of kinetic energy [P a$^2$]
a∞: Sound velocity in the ambient atmosphere
$\bar{u}$: Time-averaged speed along the jet axis
$\bar{p}$: Time-averaged density
q: Variable of turbulence model, mean square of speed variation
ω: Variable of turbulence model, mean turbulence damping ratio The variables $c_l$, $c_\tau$, and A are adjustable constants specific to a turbulence model. Those adjustable constants are adjusted such that data on a turbulence model coincide satisfactorily with known noise data obtained through experiments or the like. In the following description, symbols respectively provided with "^" and "−" will be represented by symbols respectively followed by "^" (circumflex) and "−" (over line). For example, $q_s$ circumflex will be represented by "$q_s$^" and ρ over line will be represented by "ρ−" in this text.

The position x can be indicated by spherical coordinates (R, θ, Φ), where R is distance from the outlet of the nozzle, θ is angle between a direction and the jet axis L, and Φ is angle from a reference plane.

Sound source strength S(x, f) is the strength of a sound of a frequency f at the position x. Sound propagation coefficient $\rho_a(x_2, x, f)$ is the coefficient of propagation of the sound of the frequency f between the position x and a position $x_2$. A coordinate system is a cylindrical coordinate system (y, r, α) indicating a point by distance r from the y-axis coinciding with the jet axis L on which distance from the exit of the nozzle 30 is measured, and angle α about the y-axis. A position on the cylindrical coordinate system is indicated by coordinates (y, r, α).

The sound propagation coefficient $\rho_a(x_2, x, f)$, and variables $u_a(x_2, x, f)$, $v_a(x_2, x, f)$ and $w_a(x_2, x, f)$ are obtained by numerically solving Expression (5).

$$-\bar{\rho}\left[i(2\pi f)u_a + \bar{u}\frac{\partial u_a}{\partial y_2}\right] - \gamma\bar{p}\frac{\partial p_a}{\partial y_2} = 0 \quad (5)$$

$$-\bar{\rho}\left[i(2\pi f)v_a + \bar{u}\frac{\partial v_a}{\partial y_2} - \frac{d\bar{u}}{dr_2}u_a\right] - \gamma\bar{p}\frac{\partial p_a}{\partial r_2} = 0$$

$$-\bar{\rho}\left[i(2\pi f)w_a + \bar{u}\frac{\partial w_a}{\partial y_2}\right] - \gamma\bar{p}\frac{\partial p_a}{\partial \alpha_2} = 0$$

$$-i(2\pi f)p_a - \bar{u}\frac{\partial p_a}{\partial y_2} - \left[\frac{1}{r_2}\frac{\partial(v_a r_2)}{\partial r_2} + \frac{1}{r_2}\frac{\partial w_a}{\partial \alpha_2} + \frac{\partial u_a}{\partial y_2}\right] = \frac{1}{2\pi}\delta(x_2 - x)$$

γ: Specific heat ratio
δ: Dirac δ function
$y_2$: X-coordinate of the position $x_2$
$r_2$: R-coordinate of the position $x_2$
$\alpha_2$: a-coordinate of the position $x_2$
i: Imaginary unit
$\rho_a$: Sound propagation coefficient Steps of the noise analyzing procedure will be described again on the basis of Expressions (1) to (4) expressing sound source strength and Expression (5) expressing sound propagation coefficient. The input jet conditions are received and set in step s1. The jet conditions are shown in Table 1 by way of example.

|  | Case 1 | Case 2 |
|---|---|---|
| Mach number | 0.6 | 0.8 |
| Static pressure ratio | 1 | 1 |
| Density ratio | 1.06 | 1 |

-continued

|  | Case 1 | Case 2 |
| --- | --- | --- |
| Reynolds number | $3.72 \times 10^6$ | $5.11 \times 10^6$ |
| Nozzle outlet insude diameter(m) | 0.02794 | 0.02794 |
| Jet outlet speed (m/s) | 195 | 272 |

Jet conditions for a case 1 and a case 2 are shown in Table 1. Jet exit temperature is not shown. Static pressure ratio is the ratio of the static pressure of the jet stream 31 to that of the ambient atmosphere. Mach number is the moving speed of the nozzle 30 relative to the ambient atmosphere. Density ratio is the ratio of the density of the jet stream 31 to that of the ambient atmosphere. The input device 21 is operated to give those jet conditions to the arithmetic unit 24.

Figure 5:
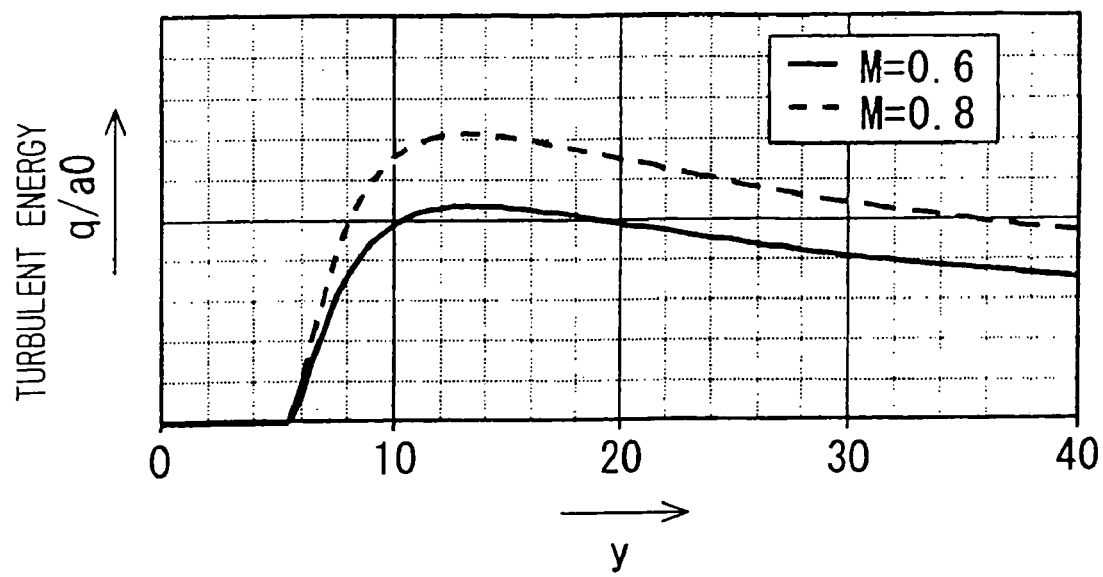
FIG. 5 is a graph showing turbulent energy determined by RANS analysis.

FIG. 5 is a graph showing turbulent energy determined by RANS analysis. In FIG. 5, the turbulent energy at positions on the y-axis, i.e., on the jet axis L, for the case 1 and that for the second case 2 are indicated by a continuous line and a broken line, respectively. In FIG. 5, y-coordinates are measured on the horizontal axis. The y-coordinates are expressed in a unit of the inside diameter D1 of the jet nozzle 30. Turbulent energy $q/a_o$ is measured on the vertical axis. The symbol $a_o$ indicates sound velocity in the ambient atmosphere. As obvious from FIG. 5, turbulent energy increases sharply from a position at a distance from the outlet of the nozzle 30, reaches a peak, and the decreases gradually with distance from the nozzle 30.

Figure 6:
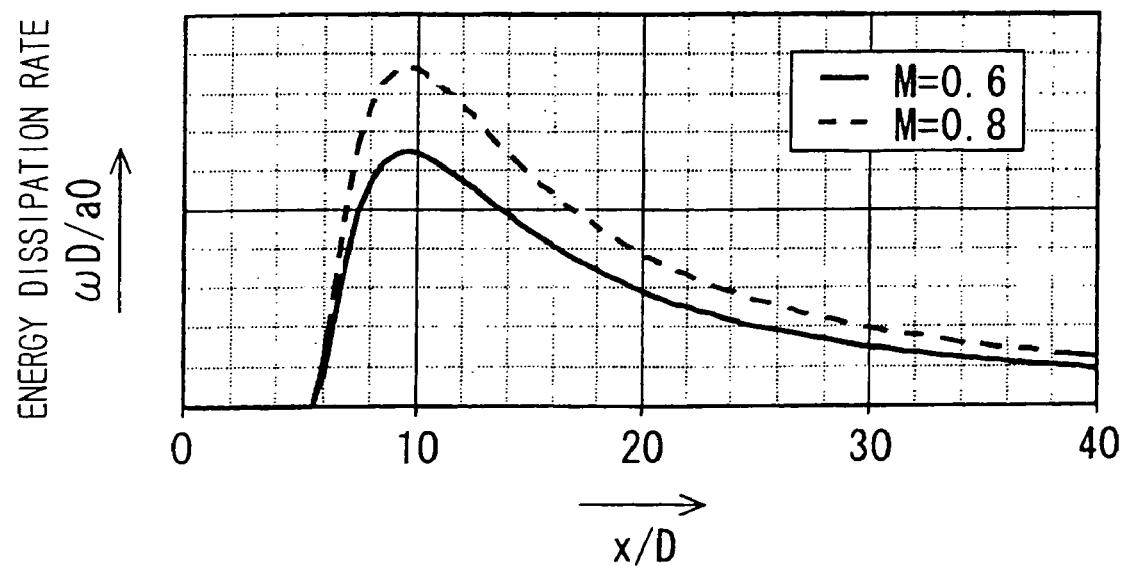
FIG. 6 is a graph showing energy dissipation determined by RANS analysis.

FIG. 6 is a graph showing energy dissipation determined by RANS analysis. In FIG. 6, a continuous line and a broken line indicate modes of dissipation of the turbulent energy at positions on the y-axis coinciding with the jet axis L, for the case 1 and the case 2, respectively. In FIG. 6, y-coordinates are measured on the horizontal axis. The y-coordinates are expressed in a unit of the inside diameter D1 of the jet nozzle 30. Turbulent energy dissipation quantity $\omega D/a_o$ indicating a state of dissipation of turbulent energy is measured on the vertical axis in FIG. 6. As obvious from FIG. 6, the dissipation of turbulent energy increases sharply from a position at a distance from the outlet of the nozzle 30, reaches a peak and decreases gradually with distance from the outlet of the nozzle 30.

Figure 7:
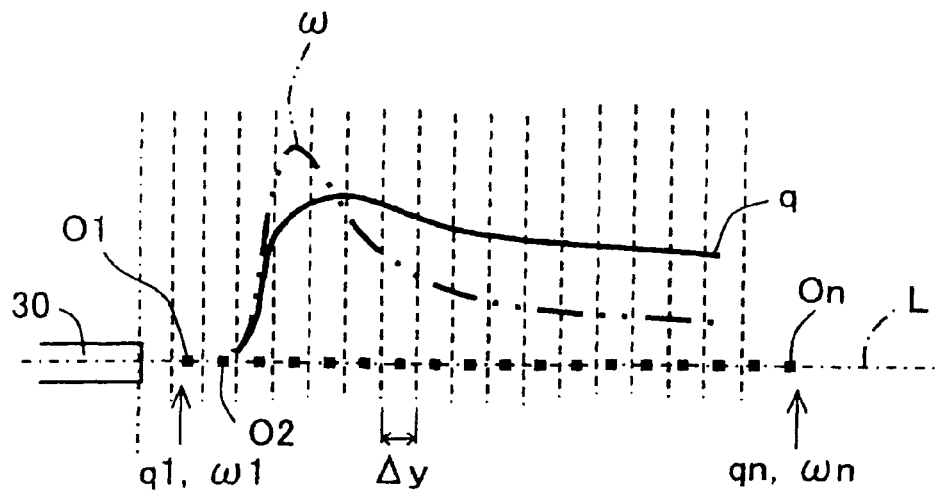
FIG. 7 is a graph showing the root mean square q of velocities and a mean turbulence damping ratio ω.

FIG. 7 is a graph showing the root mean square q of velocity variations and a mean turbulence damping ratio $\omega$. In FIG. 7, y-coordinates are measured on the horizontal axis. Root mean square q of velocity variations and mean turbulence damping ratio $\omega$ are measured on the vertical axis. Root mean square q is indicated by a continuous line and a mean turbulence damping ratio $\omega$ is indicated by a two-dot chain line. Data, for example, for the case 1 is shown in FIG. 7. In step s2, RANS analysis is carried out on the basis of the set jet conditions to obtain steady flow data, namely, basic data, as shown in FIGS. 5 to 7 by way of example.

In step s3, the propagation characteristic $p_a(x_2, x, f)$ of the propagation of the sound wave from an arbitrary position $x_2$ in the jet stream 31 to an arbitrary position x outside the jet stream 31 is determined by using the steady flow data. The propagation characteristic $p_a(x_2, x, f)$ is obtained by numerically solving Expression (5).

In step s4, the jet stream 31 is divided into sections along the jet axis L of the jet stream 31, namely, the y-axis, at intervals $\Delta y$ as shown in FIG. 7, and point sound sources are set at the respective middle points of the sections, respectively. Thus a plurality of point sound sources $O_n$ are arranged at equal intervals on the jet axis L. The numbers n are natural numbers assigned to the point sound sources in order of proximity to the nozzle exit.

Figure 8:
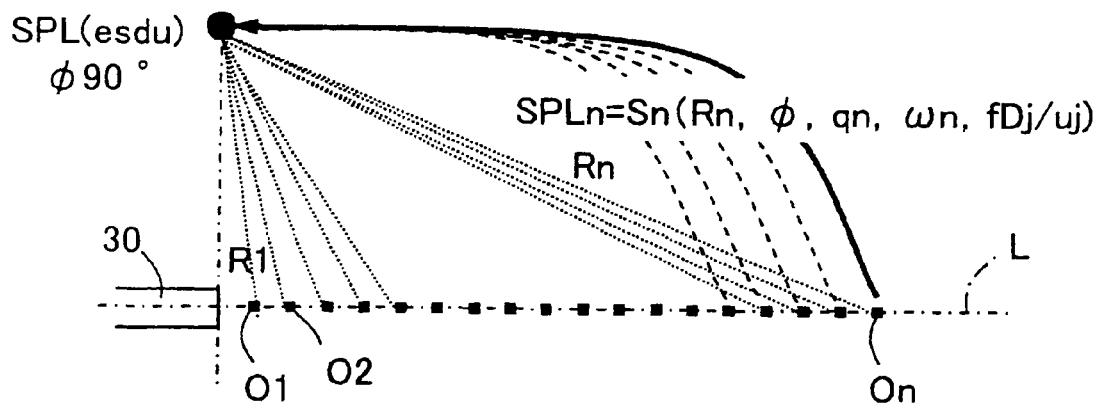
FIG. 8 is a diagram of assistance in explaining a method of determining the respective sound source strengths $S_n$ of point sound source $O_n$.

FIG. 8 is a diagram of assistance in explaining a method of determining the respective sound source strengths $S_n$ of the point sound source $O_n$. In step s4, the sound source strength $S_n$ of each point sound source $O_n$ is calculated using Expression (6) based on Expression (1), and Expressions (2) to (4).

$$S_n(f) = 8\pi^2 R^2 \left(\frac{\pi}{\ln 2}\right)^{3/2} \left(\frac{u_j}{d_j}\right) \times \iint\limits_{\substack{0 \le \theta \le \pi \\ -\pi \le \phi \le \pi}} \tag{6}$$

$$\left\{ \iiint\limits_{\substack{(i-1)r \le x_2 \le i\Delta x \\ 0 \le r_2 \le r_{max} \\ -\pi \le \phi \le \pi}} \frac{\hat{q}_s^2 l_s^3}{c^2 \tau_s} \frac{|p_a(x_2, x, f)|^2 \exp\left(-\frac{(2\pi f)^2 l_s^2}{\overline{u}^2 (4\ln 2)}\right)}{\left[1 + (2\pi f)^2 \tau_s^2 \left(1 - \frac{\overline{u}}{a_\infty}\cos\Theta\right)^2\right]} dx_2 \right\} \sin\Theta d\Theta d\Phi$$

D: Inside diameter of the exit of the nozzle 30
$u_j$: Jet exit velocity
$x_2$: Position of an optional point in the jet stream 31
x: Position of an optional point outside the jet stream 31

Figure 9:
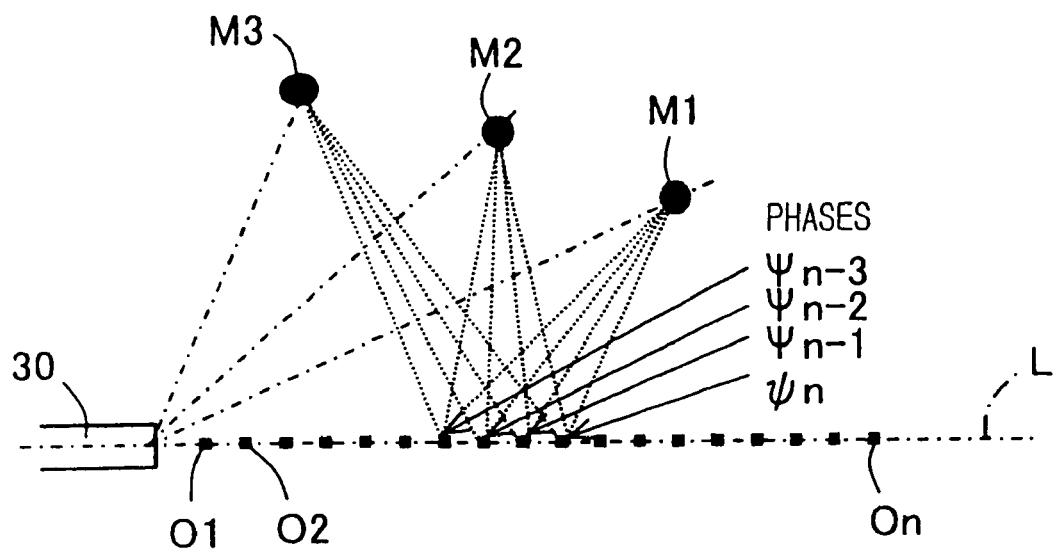
FIG. 9 is a diagram of assistance in explaining a method of determining the phases Ψ of the point sound sources $O_n$.
Figure 10:
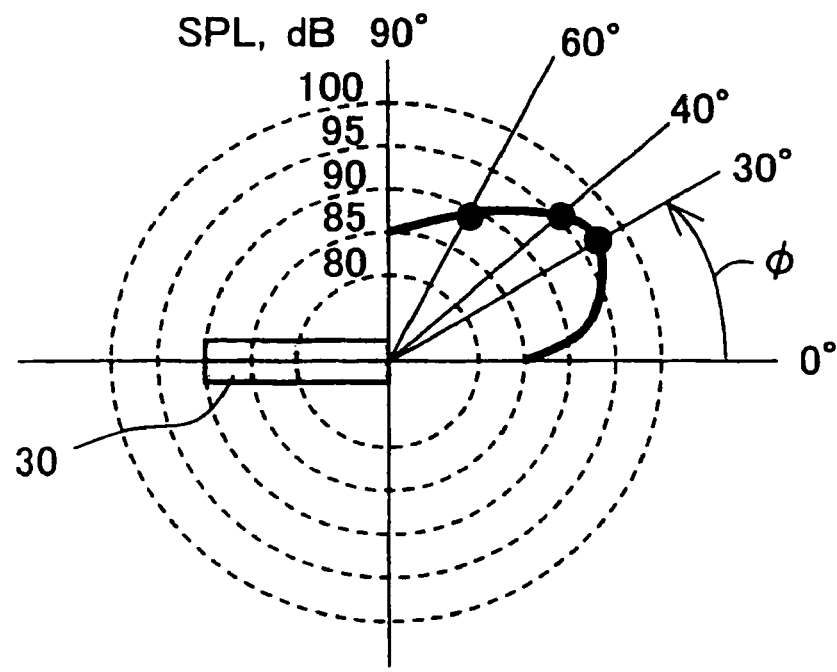
FIG. 10 is a graph showing sound pressure levels (SPL) included in an existing database by way of example.

FIG. 9 is a diagram of assistance in explaining a method of determining the phases v of the point sound sources $O_n$. FIG. 10 is a graph showing sound levels (SPL) included in an existing database by way of example. The database may be, for example, the ESDU (Engineering and Science Data Unit). A plurality of observation points $M_m$ far from the jet stream 31 respectively having different direction angles $\phi$ are set as shown in FIG. 9 in step s5. The subscript m represents any one of natural numbers assigned to the observation points, respectively, to identify the observation pints. Direction angles $\phi_m$ are identified by subscripts 1, 2, 3, ..., m−1, m, m+1, ... assigned to the direction angles $\phi$ in increasing order of direction angles $\phi$, respectively. Noise levels $L_m$ respectively for the observation points are retrieved from the existing database. For example, three observation points $M_1$ to $M_3$ are set in the example shown in FIG. 9. For example, the direction angles $\phi$ at the observation points $M_1$, $M_2$ and $M_3$ are 30°, 40° and 60°, respectively. Noise levels $L_m$ at the observation points $M_m$ as shown in FIG. 10 are retrieved from the database. Thus the noise levels $L_m$ at the distant points having the direction angles $\phi_m$ are retrieved from the existing database in step s5.

In step s6, phases $\Psi_n$ are determined respectively for the point sound sources $O_n$. The noise levels at the observation points $M_m$ are determined by using sound source strengths $S_n$ of the point sound sources $O_n$, through calculation using Expression (7). The calculated noise levels are discriminated from the noise levels $L_m$ retrieved from the database by a circumflex and are denoted by $L_m\hat{}$. To facilitate understanding, the noise levels retrieved from the existing database are called known noise levels $L_m$ and the calculated noise levels calculated using Expression (7) are called calculated noise levels $L_m\hat{}$.

$$\hat{L}_m = 10\log_{10}\left\{\left|\sum_n S_n \exp\left[i\frac{2\pi f}{a_\infty}(n\Delta y \cos\phi_m - \psi_n)\right]\right| \Big/ 4\pi r^2 p_{ref}^2\right\} \tag{7}$$

In Expression (7), "$\rho_{ref}$" is a reference sound pressure (=$2 \times 10^{-5}$ Pa) and i is imaginary unit.

In step s6, the phases $\Psi_n$ of the point sound sources $O_n$ are determined by using, for example, an optimization algorithm such that the sum of squares of the remainders of subtraction of the known noise levels $L_m$ from the corresponding calculated noise levels $L_m\hat{}$ is reduced to the least possible value. The optimization algorithm for determining the phases of the point sound sources $O_n$ is not a special one and may be any suitable algorithm, such as a gradient method or a genetic algorithm. Thus a sound source model represented by the plurality of point sound sources $O_n$ specified by the noise strengths $S_n$ and the phases $\Psi_n$ is created.

A sound field around the jet stream 31 is analyzed using the thus created sound source model and an airframe model in step s7 to evaluate the noise shielding effect of the airframe. An airframe shape having a high noise shielding effect is determined on the basis of the results of analysis made by this analyzing method. An airframe capable of reducing jet noise can be designed by using the airframe shape thus determined.

Figure 11:
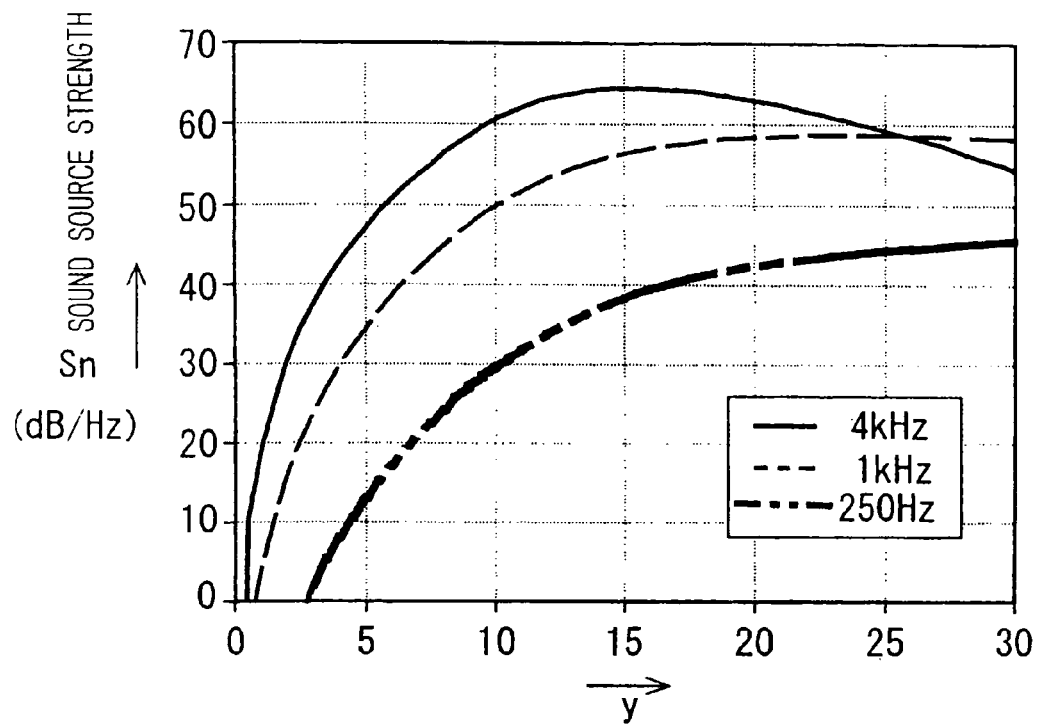
FIG. 11 is a graph showing sound source strength distributions in an example of a sound source model to be created.
Figure 12:
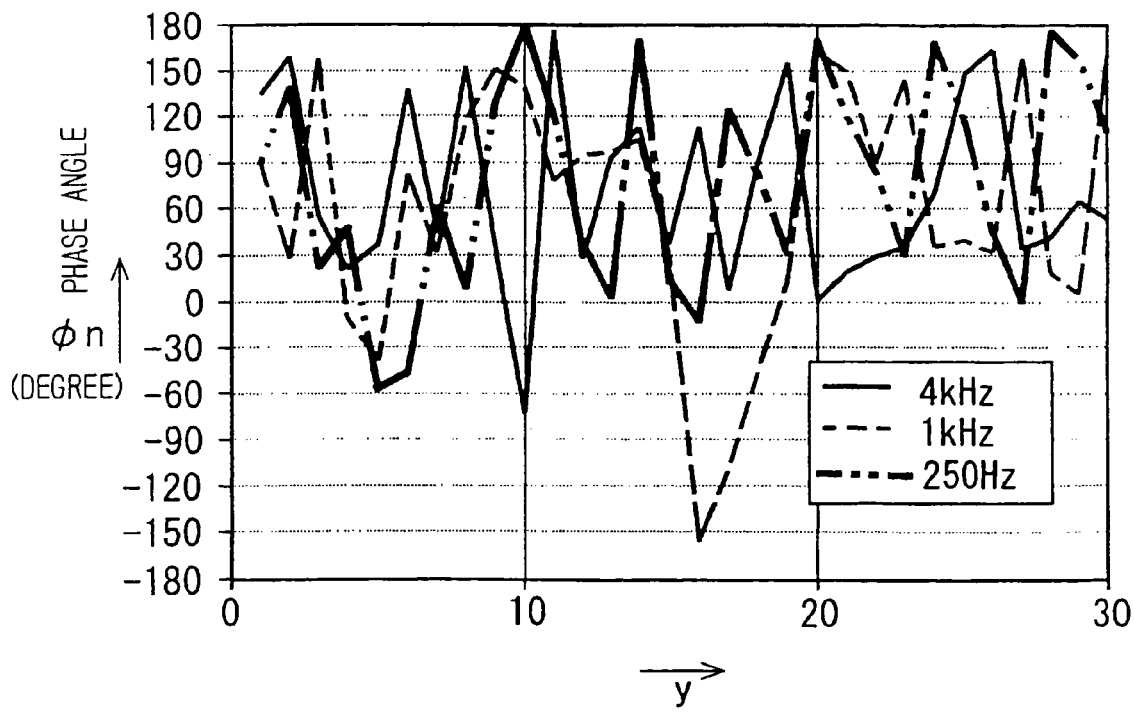
FIG. 12 is a graph showing phase distributions in an example of a sound source model to be created.

FIG. 11 is a graph showing sound source strength distributions in an example of a sound source model to be created. FIG. 12 is a graph showing phase distributions in an example of a sound source model to be created. In FIG. 11, y-coordinates are measured on the horizontal axis, and sound source strengths $S_n$ are measured o the vertical axis. In FIG. 12, y-coordinates are measured on the horizontal axis, and phase angles $\Psi_n$ are measured on the vertical axis. The y-coordinates measured on the horizontal axis in FIGS. 11 and 12 indicate positions of the point sound sources $O_n$ on the jet axis L. Values of the y-coordinates are expressed in a unit of the inside diameter D of the nozzle 30. Data shown in FIGS. 11 and 12 are for the case 2 shown in Table 1. In FIGS. 11 and 12, continuous lines, broken lines and two-dot chain lines indicate variations of sound source strength with distance for frequencies f of 4 kHz, 1 kHz and 250 Hz, respectively. Thus the method of the present invention can create a sound source model modeling the point sound sources $O_n$ by using the sound source strengths $S_n$ and the phases $\Psi_n$.

Figure 13:
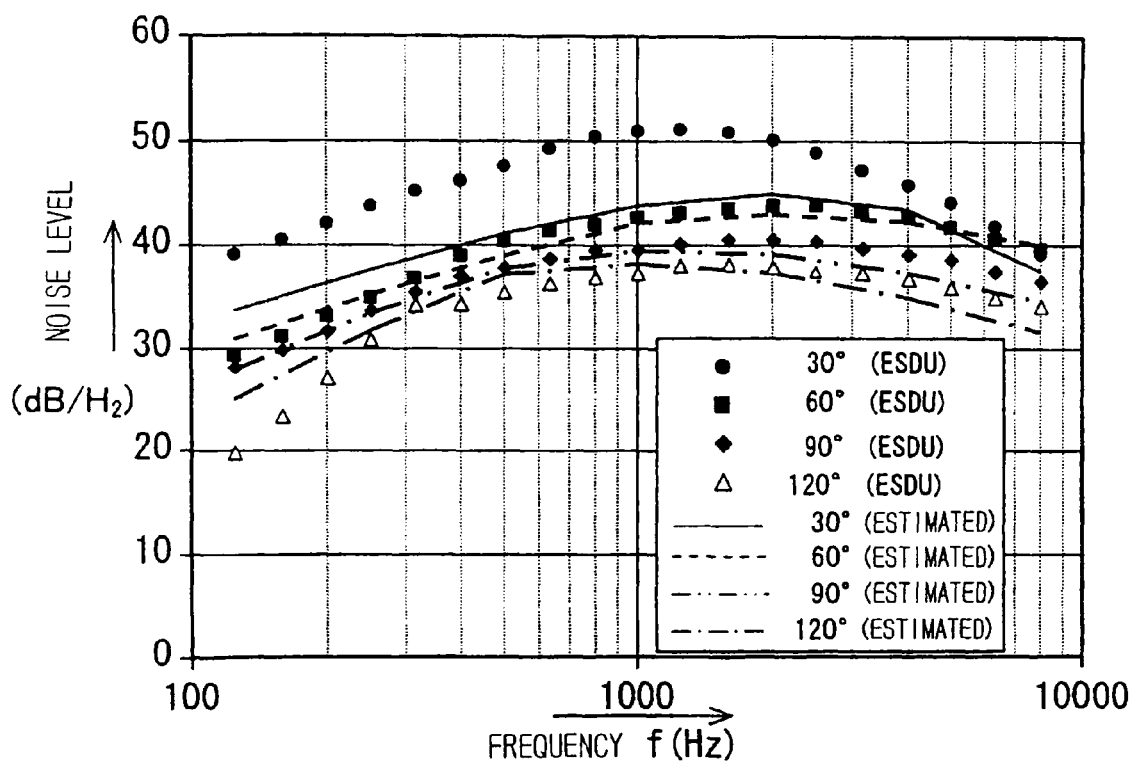
FIG. 13 is a graph showing an example of a noise level estimated by using a sound source model of a case 1 specified in Table 1.
Figure 14:
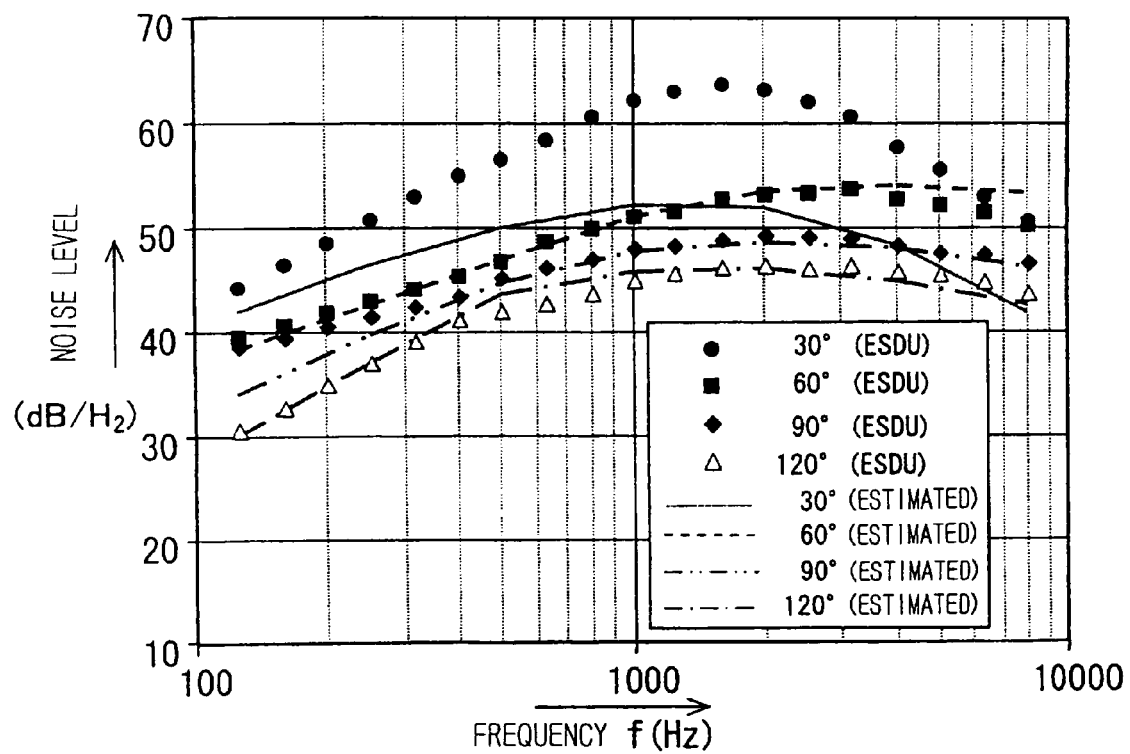
FIG. 14 is a graph showing an example of a noise level estimated by using a sound source model of a case 2 specified in Table 1.

FIG. 13 is a graph showing an example of a noise level estimated by using the sound source model of the case 1 specified in Table 1 and FIG. 14 is a graph showing an example of a noise level estimated by using the sound source model of the case 2 specified in Table 1. Data shown in FIGS. 13 and 14 was obtained through estimation using a sound source model created by determining the phase angles $\Psi_n$ such that the calculated sound levels $L_m\hat{}$ for the observation point having a direction angle of 90° agree most closely with the corresponding known sound levels Lm in step s6 in relation with sound radiation of fine scale turbulence.

In FIGS. 13 and 14, frequencies are measured on the horizontal axis, and noise levels are measured on the vertical axis. In FIGS. 13 and 14 solid circles, solid squares, solid rhombuses, and blank triangles indicate noise levels retrieved from the ESDU, namely, the existing database, for direction angles ϕ of 30°, 60°, 90° and 120°, respectively. In FIGS. 13 and 14, solid lines, broken lines, two-dot chain lines and chain lines indicate estimated variations of noise levels estimated through the analysis of an ambient sound field using the created sound source model for direction angles ϕ of 30°, 60°, 90° and 120°, respectively. As obvious from FIGS. 13 and 14, although the estimated sound level for the observation point in the direction of the direction angle ϕ of 30° is somewhat different from the corresponding noise level retrieved from the existing database, the estimated noise levels agree comparatively satisfactorily with the corresponding noise levels retrieved from the existing database.

Figure 15:
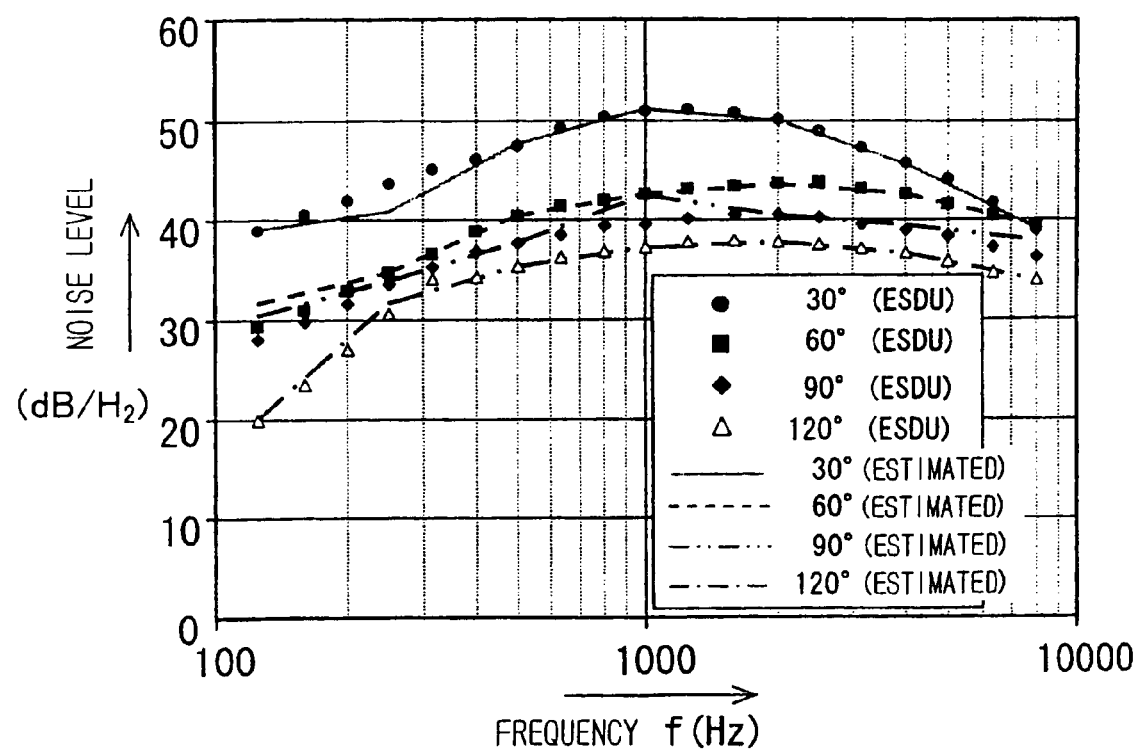
FIG. 15 is a graph showing another example of noise levels estimated by using a sound source model for a case 1 specified in Table 1.
Figure 16:
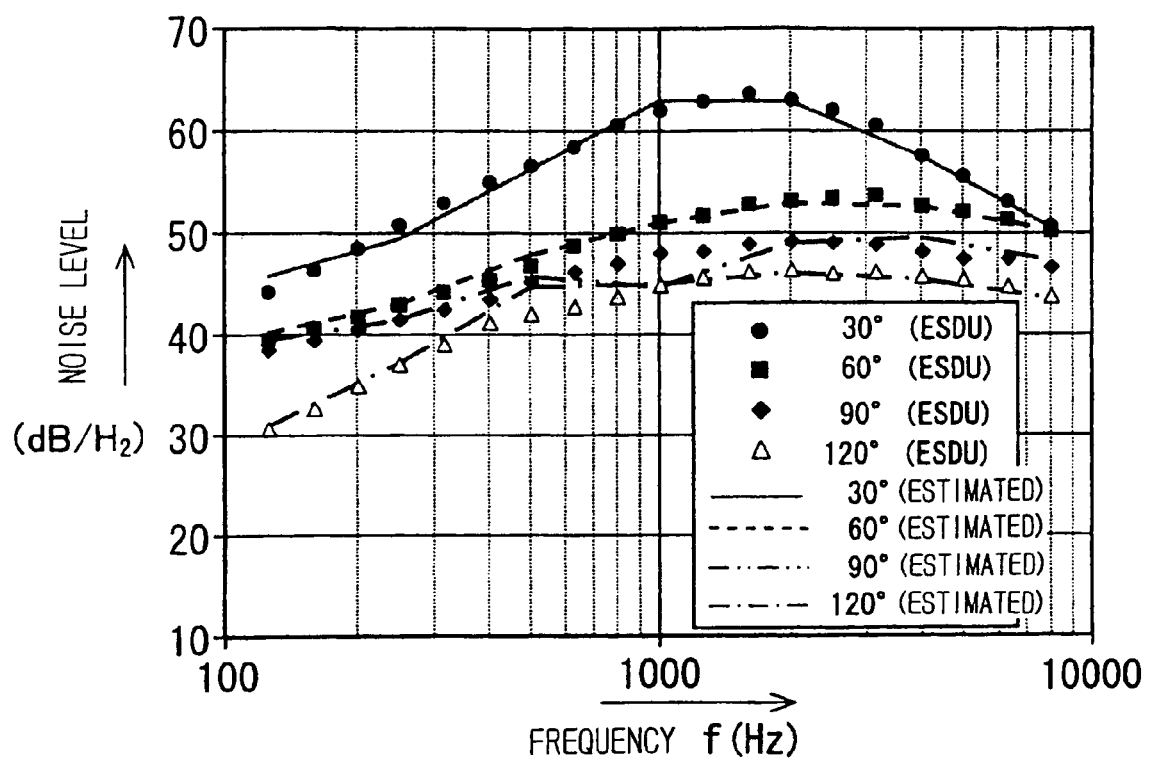
FIG. 16 is a graph showing another example of a noise levels estimated by using a sound source model for a case 2 specified in Table 1.
Figure 17:
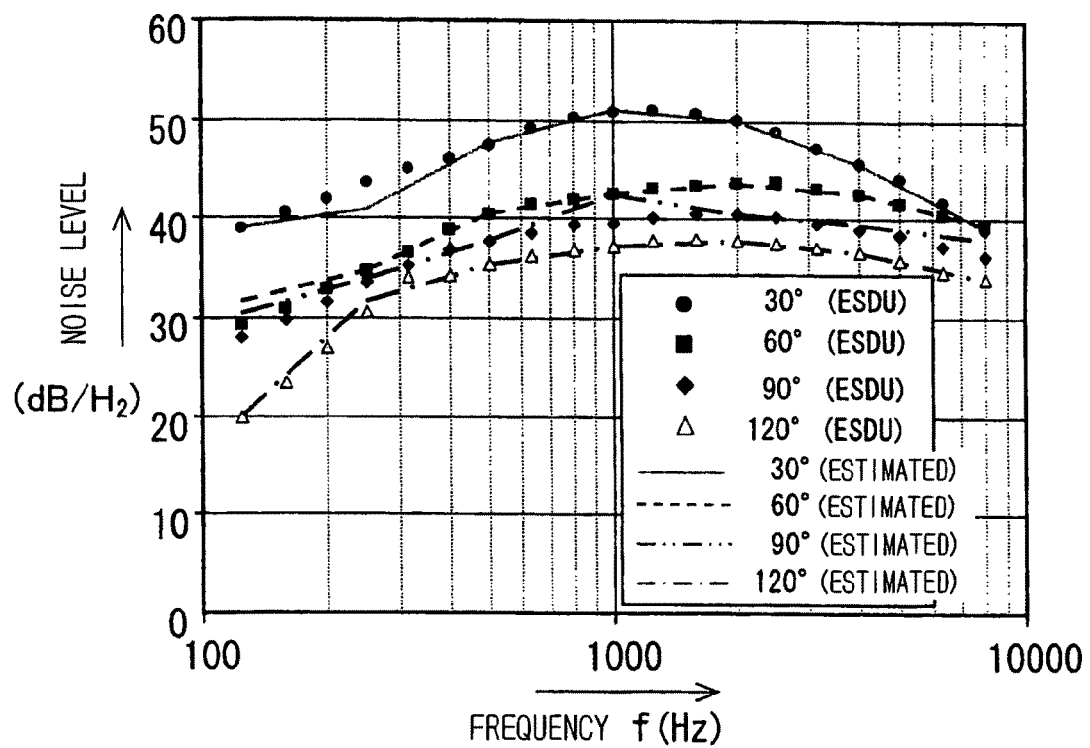
Figure 18:
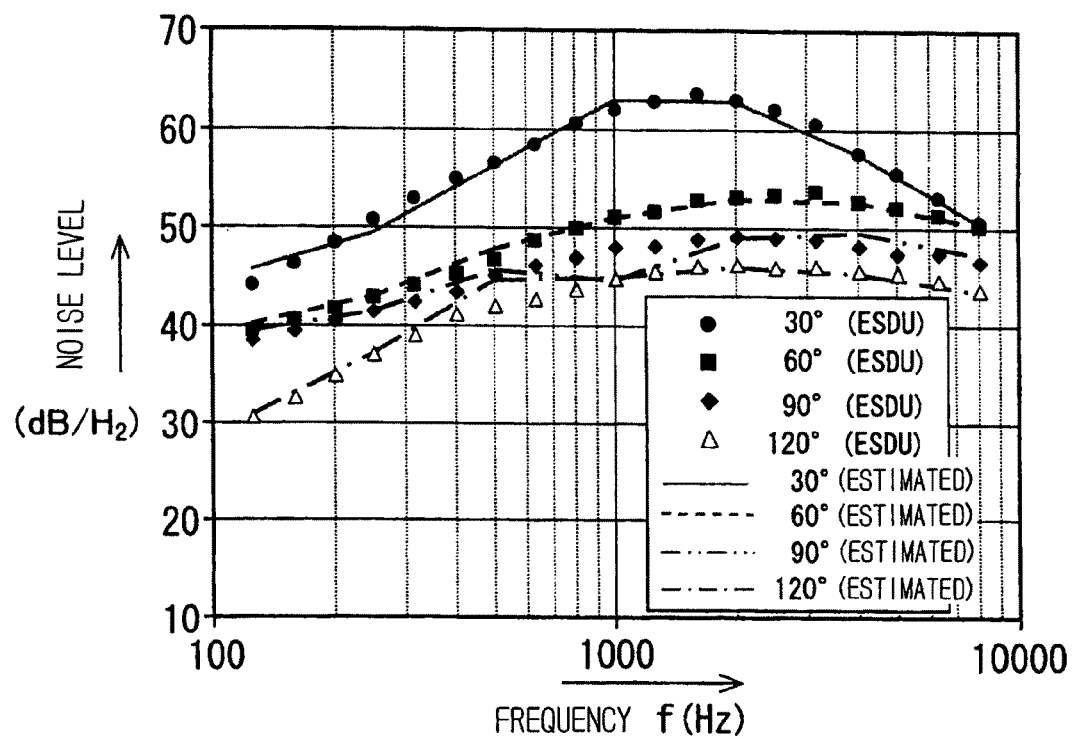

FIG. 15 is a graph showing another example of noise levels estimated by using a created sound source model for the case 1 specified in Table 1 and FIG. 16 is a graph showing another example of noise levels estimated by using the created sound source model for the case 2 specified in Table 1. Data shown in FIGS. 15 and 16 was obtained through estimation using a sound source model created by determining the phases $\Psi_n$ such that the calculated sound levels $L_m\hat{}$ for the observation point having a direction angle of 30° agree most closely with the corresponding known sound levels $L_m$ in step s6 in relation with sound radiation of large turbulences structures.

In FIGS. 15 and 16, frequencies are measured on the horizontal axis, and noise levels are measured on the vertical axis. In FIGS. 15 and 16 solid circles, solid squares, solid rhombuses, and blank triangles indicate noise levels retrieved from the ESDU, namely, the existing database, for direction angles ϕ of 30°, 60°, 90° and 120°, respectively. In FIGS. 15 and 16, continuous lines, broken lines, two-dot chain lines and chain lines indicate estimated variations of noise levels estimated through the analysis of an ambient sound field using the created sound source model for direction angles ϕ of 30°, 60°, 90° and 120°, respectively. As obvious from FIGS. 15 and 16, the estimated sound levels are approximately equal to the corresponding noise levels retrieved from the existing database regardless of direction angles ϕ. As shown in FIG. 3, the jet noise as viewed macroscopically has a directional characteristic such that the jet noise is radiated in a direction of a direction angle ϕ of 30°. The sound source model used for estimating the data shown in FIGS. 15 and 16 was created by determining the phase in connection with an observation point in a jet noise radiating direction. The jet noise radiating direction is a direction in which jet noise of a high radiant intensity is radiated. The sound source model created by taking into consideration the directional characteristic of the jet noise in relation with the jet noise radiating direction is an accurate sound source model capable of simulating noises in a wide range of direction angles between 30° and 120°.

As apparent from the foregoing description, the sound source modeling method and the noise analyzing method of the present invention are applicable to the noise analysis and design of a low-resistance blended wing body airframe, for example, to reduce sonic boom strength by half. The sound source modeling method and the noise analyzing method of the present invention are applicable to noise analysis and design for techniques of integrating advanced systems including unmanned aircraft capable of taking off, landing and supersonic flying. The sound source modeling method and the noise analyzing method of the present invention can be applied to the analysis of a sound field around a rocket launching pad.

The foregoing embodiments are only examples of the present invention and many changes and variations are possible therein. For example, an algorithm other than the algorithm used herein may be used, and the set positions of the point sound sources do not necessarily need to be arranged at equal intervals on the jet axis.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:
1. A jet noise source modeling method, comprising:
    setting a plurality of point sound sources for quantizing a strength distribution of a jet noise source determined through an analysis of a jet stream by dividing the jet stream into sections along an axis of the jet stream, the plurality of point sound sources being set at respective points of the sections;

determining respective sound source strengths of respective point sound sources;

determining respective phases of the respective point sound sources based on the respective sound source strengths taken at a plurality of observation points and a known noise level of a far free sound field related with the jet stream; and creating, with a computer processor, a jet noise source model based on the determined respective phases.

2. The jet noise source modeling method according to claim 1, wherein the point sound sources are set along a jet axis of the jet stream.

3. A jet noise analyzing method, comprising:

setting a plurality of point sound sources for quantizing a strength distribution of a jet noise source determined through an analysis of a jet stream by dividing the jet stream into sections along an axis of the jet stream, the plurality of point sound sources being set at respective points of the sections;

determining respective sound source strengths of respective point sound sources;

determining respective phases of the respective point sound sources based on the respective sound source strengths taken at a plurality of observation points and a known noise level of a far free sound field related with the jet stream;

creating, with a computer processor, a jet noise source model based on the determined respective phases; and analyzing a sound field around the jet stream, with the computer processor, by using the created jet noise source model.

4. An aircraft designing method of designing an aircraft, comprising:

setting a plurality of point sound sources for quantizing a strength distribution of a jet noise source determined through an analysis of a jet stream by dividing the jet stream into sections along an axis of the jet stream, the plurality of point sound sources being set at respective points of the sections;

determining respective sound source strengths of respective point sound sources;

determining respective phases of the respective point sound sources based on the respective sound source strengths taken at a plurality of observation points and a known noise level of a far free sound field related with the jet stream;

creating, with a computer processor, the jet noise source model based on the determined respective phases;

analyzing a sound field around the jet stream, with the computer processor, by using the created jet noise source model; and designing the aircraft by taking into account an influence of an airframe of the aircraft on the analyzed sound field.

* * * * *